(12) United States Patent
Hinckley et al.

(10) Patent No.: US 7,797,202 B1
(45) Date of Patent: Sep. 14, 2010

(54) METHOD OF MASKING THE IDENTITIES OF BOTH A BIDDER AND SELLER IN AN AUCTION

(75) Inventors: Paul F. Hinckley, North Reading, MA (US); Thomas J. Mahoney, Rye, NH (US)

(73) Assignee: Asian Atlantic Industries, Inc., Stratham, NH (US)

( * ) Notice: Subject to any disclaimer, the term of this patent is extended or adjusted under 35 U.S.C. 154(b) by 431 days.

(21) Appl. No.: 12/070,714

(22) Filed: Feb. 20, 2008

Related U.S. Application Data

(60) Provisional application No. 60/902,300, filed on Feb. 20, 2007, provisional application No. 60/903,160, filed on Feb. 23, 2007.

(51) Int. Cl.
  *G06Q 30/00* (2006.01)
  *G06F 17/30* (2006.01)
(52) U.S. Cl. .......................... 705/26; 705/27
(58) Field of Classification Search .................. 705/26, 705/27
  See application file for complete search history.

(56) References Cited

U.S. PATENT DOCUMENTS

| | | | |
|---|---|---|---|
| 6,598,027 B1 * | 7/2003 | Breen et al. .................. 705/26 |
| 7,587,340 B2 * | 9/2009 | Seidman et al. ............... 705/26 |
| 7,693,748 B1 * | 4/2010 | Mesaros ....................... 705/26 |
| 2001/0049647 A1 * | 12/2001 | Sheehan et al. ............... 705/37 |
| 2001/0056395 A1 * | 12/2001 | Khan ........................... 705/37 |
| 2002/0103746 A1 * | 8/2002 | Moffett, Jr. .................. 705/37 |
| 2002/0147655 A1 * | 10/2002 | Say .............................. 705/26 |
| 2002/0198777 A1 * | 12/2002 | Yuasa .......................... 705/14 |
| 2003/0195839 A1 * | 10/2003 | Dinwoodie ................... 705/37 |
| 2003/0220867 A1 * | 11/2003 | Goodwin et al. .............. 705/37 |
| 2004/0128224 A1 * | 7/2004 | Dabney et al. ................ 705/37 |
| 2005/0171858 A1 * | 8/2005 | Cotton et al. ................. 705/26 |
| 2006/0074780 A1 * | 4/2006 | Taylor et al. ................. 705/35 |
| 2006/0259391 A1 * | 11/2006 | Schoen et al. ................ 705/37 |
| 2007/0050290 A1 * | 3/2007 | Heitner et al. ............... 705/39 |
| 2007/0061216 A1 * | 3/2007 | Jain et al. .................... 705/26 |

OTHER PUBLICATIONS

Business Digest, New York Times, Late Edition—Final ED, col. 1, p. 1, Monday Apr. 19, 1999.*

* cited by examiner

*Primary Examiner*—Yogesh C Garg
*Assistant Examiner*—Matthew Zimmerman
(74) *Attorney, Agent, or Firm*—Eckert Seamans Cherin & Mellot, LLC; David C. Jenkins, Esq.

(57) ABSTRACT

A method of selling excess component inventory between manufacturers wherein a provider provides a forum wherein users may sell components anonymously in a closed sale by using a pseudonym or, preferably, a pseudo-account number. Further, other identifying information, such as any part numbers used internally by the seller are masked.

14 Claims, 4 Drawing Sheets

METHOD OF MASKING THE IDENTITIES OF BOTH A BIDDER AND SELLER IN AN AUCTION

CROSS-REFERENCE TO RELATED APPLICATION

The present application claims the benefit of U.S. Provisional Patent Application Ser. No. 60/902,300, filed Feb. 20, 2007, entitled "Method of Selling Excess Component Inventory Between Manufacturers" and U.S. Provisional Patent Application Ser. No. 60/903,160, filed Feb. 23, 2007, entitled "Method of Selling Excess Component Inventory for Maximizing Recovery of Original Cost."

BACKGROUND OF THE INVENTION

1. Field of the Invention

The invention relates to a method of selling excess component inventory, and more specifically, to a method of selling excess component inventory in a closed forum, wherein both the seller and the buyer in the initial forum use the type of components sold. After a prescribed period of time, items also become visible in a sub-forum for pre-approved excess liquidator companies to access only the sub-forum and place offers for consideration.

2. Description of the Prior Art

Original Equipment Manufacturers ("OEM") and Contract Electronics Manufacturers ("CEM") generally do not manufacture the sub-components used in their products. Such sub-components are purchased in bulk from sub-component manufacturers. When an OEM stops making a particular product, they typically have excess inventory of one or more sub-components. To recoup the loss associated with idle excess inventory, most OEMs sell or attempt to sell such excess inventory through an excess liquidator, a broker for excess inventory. This system, however, has several disadvantages that may be better explained through the use of an example.

While it is understood that any type of goods manufacturer may be used as an example, the following example is addressed to electronics and electronics manufacturers. OEM1 produces computer motherboards. The motherboards utilize a sub-component structured to convert data into a signal for an audio speaker. This sub-component is purchased from a sub-component manufacturer ("MfgA") and is identified by their Manufacturer's Part Number ("MPN1"). OEM1, however, utilizes an Internal Part Number, ("IPN1"), to identify the location on the board where the first sub-component will be attached. By identifying the location on the board, OEM1 allows the possibility of using interchangeably equivalent sub-components (Suggested Alternates). MPN1 is also used by a second component manufacturer ("OEM2") who makes circuit boards for a customer that manufactures portable music devices. OEM2 has a second IPN assigned for the first chip and further utilizes a Customer Part Number ("CPN") to track the first chip. That is, the second component manufacturer's customer may demand that all of its suppliers, including the second component manufacturer, utilize a common tracking number, these numbers are the CPNs.

When OEM1 ends production of the first type of computer motherboard, OEM1 has excess inventory of the first chip. While OEM1 would like to sell the excess inventory of MPN1, OEM1 does not wish to alert competitors that it is ending production of the first type of computer motherboard. Thus, OEM1 utilizes a first broker ("Broker1") to sell the excess inventory of MPN1. The first broker, however, takes a fee, typically the difference between the cost Broker1 pays to OEM1 and the sell price they can generate by selling MPN1 to another broker or OEM in need of that component. At about the same time, MfgA is having difficulty meeting demand for MPN1 and a second component manufacturer ("OEM2") is seeking to purchase more MPN1 chips. Accordingly, OEM2 engages a second broker ("Broker2") to locate and acquire more MPN1 chips. Broker2 also requires a fee from OEM2, typically the difference between whatever Broker2 can purchase the chips for and the price that OEM2 agrees to pay. After some delay, Broker1 and Broker2 engage and arrange for the sale of MPN1 chips, effectively from OEM1 to OEM2. Thus, one disadvantage of this system is that there are multiple broker fees applied to the sale of the components, that is, MPN1 chips.

Another disadvantage is that the different OEMs, that is, OEM1, OEM2, MfgA, and OEM2's customer, each have a different tracking, or identification number, associated with MPN1. Thus, if Broker1 were to utilize OEM1's internal part number ("IPN") when offering the MPN1 chips for sale, while at the same time Broker2 utilized OEM2's internal part number ("IPN") when seeking to buy MPN1 chips, the brokers may not realize there is both a current supply and demand for MPN1 chips.

While a simple solution may seem to be the use of the Manufacturer Part Number in every instance, however, reality is not that simple. First, usage rates of components and sub-components are guarded secrets that OEMs want to protect and their competitors wish to discover. As such, OEMs are reluctant to disclose part numbers of components being resold. Furthermore, components may be produced by more than one sub-component manufacturer. That is, in addition to OEM1 utilizing MPN1, MfgB's manufacturer part number may be identical or substantially similar to MPN1, however, it effectively is identified with a second sub-component manufacturer's part number ("MPN2"). The MPN1 chips from MfgA and MfgB may be mixed while at OEM1. This is one reason OEM1 assigns the chips an internal part number or IPN. Thus, when the OEM1 wishes to sell the excess inventory of MPN1 chips, it cannot simply use MfgA's MPN1 part number. Thus, much is left to the brokers to inform each other what is for sale and what is needed without disclosing confidential information.

Another disadvantage to this system is that OEMs with a need to sell/buy excess inventory may be related entities, such as, but not limited to, a parent and subsidiary company. If the parent and subsidiary use different IPNs, a situation may arise, wherein a parent company utilizes a first broker and the subsidiary company utilizes a second broker to complete the sale of excess inventory. Thus, a company may actually pay two broker fees to transfer components to a related company or even between different manufacturing locations within the same company.

SUMMARY OF THE INVENTION

Figure 1:
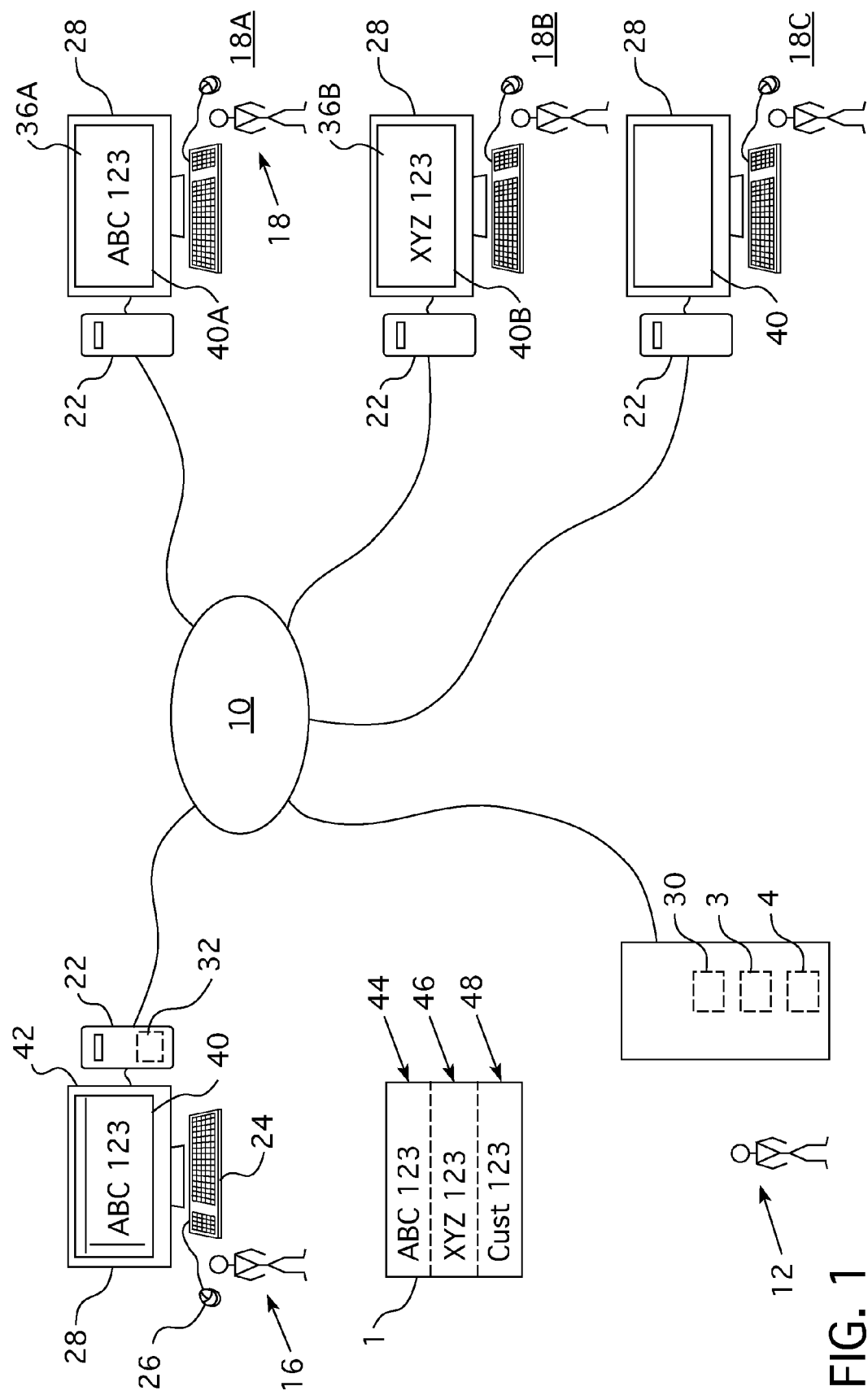
FIG. 1 is a schematic of a computer network

The present concept provides a method of selling excess component inventory between OEM manufacturers, wherein a provider provides a Forum wherein users may list components anonymously by hiding, masking, or simply not revealing User Names or their related companies. The provider allows the users to submit data relating to the component including any Manufacturer Part Number(s) ("MPNs"), any Internal Part Number(s) ("IPNs"), any Customer Part Number(s) ("CPNs"), as well as other data that describes the component. The provider further provides a system for masking selected component information, such as, but not limited to, the Internal Part Number(s) ("IPNs") and Customer Part Number(s) ("CPNs").

Typically, users wish to sell or buy more than a single unit of a component. Again using electronics as an example, users typically seek to buy or sell multiple units of a single type of component. It is, therefore, understood that the word "component" as used herein means at least one or a plurality of a fungible component.

Generally, multiple users register with the provider and are linked at registration to an account having a number in the provider's main database. At least one user acts as a seller and at least one user, and preferably a plurality of users, acts as an interested buyer. The user acting as a seller supplies the provider with the sub-component data for the sub-component it is selling ("IPN1"). Any confidential data is masked, and a neutral descriptor is created. The neutral descriptor may be a commonly known descriptor such as, but not limited to, the Manufacturer Part Number ("MPN"). Alternatively, the provider may create a pseudo-number to act as a neutral descriptor. The first sub-component ("MPN1") resides exclusively in this domain of sub-components ("MPNs"), component manufacturers ("OEMs") and sub-component manufacturers ("MFGs") for a pre-determined period of time, usually 30 to 60 days, at the discretion of the OEM providing the data, and subsequently is made visible in an individual OEM's privately labeled sub-domain, called an XL to suggest "eXcess Liquidation," with completely different sub-domain users, these users being the independent distributors or brokers pre-defined and authorized by the OEM whose company has had the private labeled sub-domain constructed specifically for them. It is in these privately labeled sub-domains that all sub-components are then put up for bid submission or offers in their Sub-Forum. As is known in the art, a Sub-Forum is, preferably, an Internet web site structured to accommodate multiple, simultaneous sub-component bidding.

If the sub-component's neutral descriptor is a known descriptor, such as, but not limited to, the Manufacturer Part Number ("MPN"), an authorized Sub-Forum Bidder (Approved Liquidator) may immediately enter into the sub-forum and place Bids for an OEM administrator's consideration, as detailed below. The Sub-Forum Bidder may search upon a descriptor, typically the Manufacturer Part Number ("MPN"). Sub-Forums provide a minimal amount of information regarding the OEM offering sub-components, bidding on the sub-components, and/or sub-forum participants observing sub-forum activity. However, with this method, the identity of the users is masked each time the user enters the sub-forum. That is, instead of identifying the Bidders by a user name, they are identified by a Bidder ID, and then only after a bid(s) is submitted are details revealed about the plant location and OEM administrator responsible for accepting the offer and completing the transaction. Communication is monitored but taken off line using e-mail addresses provided after a bid has been submitted. Additionally, Bidders never know other Bidder identities to and no bidder can track what excess inventory another bidder is bidding upon or being awarded. Summary information is provided for viewing only by the specific OEM's authorized administrators designated by each OEM's sub-domain forum being utilized.

DESCRIPTION OF THE PREFERRED EMBODIMENTS

As used herein, the domain Forum is a restricted community of manufacturing entities that specifically is intended to exclude brokers and distributors.

As used herein, the phrase "closed sale" means a manufacturer-seller offering at least one item or component for sale in a domain or sub-domains (Sub-Forum) usually privately labeled, controlled by a provider and allowing a number of manufacturer-buyers to buy the components that are offered in the domain and allowing a number of non-manufacturer-buyers, typically liquidators, to buy the components that are offered in the sub-domain.

As used herein, a "related user" means a user that is a business entity that is related to, or has an association with, another business entity. For example, such a relationship may be, but is not limited to, parent and subsidiary companies, two subsidiary companies of a single parent company, business entities acting in partnership, or business entities having an alliance.

As used herein, an "identification number" is a string of one or more characters, the characters may be actual numbers, such as, but not limited to, Arabic numerals, but may also be letters, symbols, or any other indicia.

As is understood in the art, a "web site" is one or more computer programs, or other set of instructions, structured to generate an image on one or more computers. As is used in common parlance, one may "visit" or otherwise interact with a web site using an electronic device such as, but not limited to, a computer running an Internet browser program.

As used herein, a "domain," "forum," "sub-domain," or "sub-forum" is an electronic construct existing on an electronic device or network which two or more users may interact with via an electronic device. For example, a web site is a type of domain or forum that is accessed by a computer via the Internet. Other types of domains or forums are accessible by other types of electronic devices.

As shown in FIG. 1, at least one embodiment of the method facilitates the selling of excess inventory between multiple users through a trusted third party, the Forum host. The system uses a computer and the Internet to facilitate Forum, whereby registered users login with a user name and password to perform searches of OEM excess inventory, as well as searches of OEM Requirements. Companies offering excess component inventory for sale or posting requirements to buy are masked from the user's view, as are the user companies performing searches. Anonymity is a key ingredient for user participation in this Forum. Interest in specific line items from search result screens are captured and ported to agents assigned to specific accounts by the Forum provider. Forum provider agents clarify details for both the buyer and the seller, finalizing the transfer of product through the provider, maintaining buyer and seller anonymity. The aforementioned details are too costly to investigate and provide in Forum at the outset and must be clarified by provider agents at the time of participant inquiry to ensure lowest cost and highest recovery of original asset purchase price. Only OEMs and CEMs are allowed to search and express interest in the Forum, which by design is intended to provide the highest recovery on excess inventory sub-component original purchase cost.

Sub-Forum is constructed and private labeled for specific OEM or CEM accounts requiring additional functionality in the disposition of excess and obsolete sub-components. Each Sub-Forum is constructed in cooperation with business objectives for the intended branded OEM. The specific OEM for which the sub-forum was built controls the activity in the sub-forum. The provider facilitates the functionality.

Preferably, the system utilizes a computer network 10, such as, but not limited to, the Internet. The closed sale is coordinated by a provider 12 and relies on multiple users 14 which act as sellers 16, bidders 18, or both. As is known in the art, each participant operates via a computer 22. Each computer 22 includes a processor, memory devices (all not shown), input devices, such as, but not limited to, a keyboard 24 and mouse 26, and output devices such as, but not limited to, a monitor 28, as well as communication devices such as, but not limited to, a modem (not shown). As further known in the art, the computer 22 operated by the provider 12 acts as a server 30, and each computer 22 operated by a user 14 acts as a client 32. That is, the server 30 hosts a forum 36 such as, but not limited to, a web site 40. The web site 40 is in electrical communication with the computer network 10. The web site 40 is further structured to communicate, that is, send and receives data via the computer network 10, with a browser 42 on each client 32. Similarly, each browser 42 is structured to communicate with the web site 40 via the computer network 10.

The method disclosed below provides for the selling or, preferably, reselling of items or components 1 between two or more users 14. As set forth above, and discussed in more detail below, there must be at least one component 1 offered for sale. More typically, the at least one component 1 is a plurality of similar components such as, but not limited to, electrical components 1. Such components 1 have a set of characteristics that may be identified by those skilled in the art. For example, a description such as "16 Mb (4Mx4) 2kRF 5V 300 mil SOJ 6Ons" indicates that the components 1 may or may not have descriptive details with a superficial indication of functionality or construction. The components 1 also typically have at least a private, first identification number 44, such as an Internal Part Number, as well as, a public, second identification number 46, such as a Manufacturer Part Number. Alternatively, the second identification number 46 may be a tracking number invented by the provider 12. The component 1 may have a plurality of other private or public identification numbers such as, but not limited to, a public third identification number 48, e.g., a Customer Part Number. As is known in the art of commercial web sites, the web site 40 has common features such as, but not limited to, a search module 3 and an account manager module 4. The search module 3 allows users 14 to enter information, such as, but not limited to, a Manufacturer Part Number or other public, second identification number 46 to determine if such a component is currently offered for sale. The account manager module 4 allows the user 14 to make changes to their account information such as, but not limited to, contact information or a contact address.

The method includes the steps of providing 102 a forum 36 and allowing 104 at least one first user 14 to act as a seller 16. That is, the seller 16 is allowed 106 to initiate a closed sale of at least one component 1 and/or is allowed 107 to initiate different closed sales on different components, wherein each closed sale relates to at least one component. Each closed sale has a start date. The seller 16 is further allowed 108 to identify 110 the at least one component 1 that is the subject of the closed sale by providing a description of the component characteristics. The identification 110 may include a description of the component characteristics, but preferably, the at least one component 1 has a first identification number 44 and a second identification number 46, as set forth above. Thus, the identification 110 may include the further step of allowing 112 the seller 16 to provide the first identification number 44 and the second identification number 46 for the at least one component 1. The provider 12 records 114 the association between the first identification number 44 and the second identification number 46 with the at least one component 1. That is, the first identification number 44 and the second identification number 46, as well as the description of the component characteristics, are stored in a database so that such information may be retrieved at a later time. The at least one component 1 is then offered 120 for sale in the forum 36 by presenting the public the second identification number 46.

The provider 12 further allows 130 at least one second user 14 to act as a bidder 18. The bidder 18 is allowed 132 to access the forum 36 and allowed 134 to view components 1 that are for sale. More specifically, the bidder 18 is allowed 136 to view the components 1 as identified by their public, second identification number 46. The bidder 18 is further allowed 138 to bid on the at least one component 1 and the seller 16 is allowed 140 to accept a bid from the bidder 18. Finally, the seller 16 and the bidder 18 are allowed 142 to complete the sale of the at least one component 1.

While only allowing public, second identification numbers 46 to be seen in the forum 36 disguise some data relating to the sale of the component 1, the method, preferably, includes the step of masking 150 the identity of each user 14 utilizing the forum 36. That is, where the forum 36 is a web site 40, the step of providing 102 a forum 36 also includes the steps of providing 159 a web site 40, allowing 160 each user 14 to access the web site 40 and allowing 162 each user to register for an account associated with the web site 40. When a user 14 registers for an account, the user 14 is provided 153 with an account having an identification number and, preferably, a password. Thus, the step of masking 150 the identity of each user 14 may include the step of not presenting 152 any said user identification number in the forum 36. The step of not presenting 152 any user identification may also be applied to the web site 40. However, because the users 14 must be identified in some manner, each user 14 is preferably assigned 154 a pseudo-account number that is a false identification that may be displayed on the web site 40. However, because users 14 may be participating in multiple closed sales at one time, and because competitors may be able to determine a user's 14 identity based upon information relating to the components 1 being sold or bought, or because following the termination of one closed sale, a seller's 16 and/or bidder's 18 identity may be revealed while other closed sales continue, the step of assigning 154 a user 14 a pseudo-account number includes the further steps of assigning 156 a pseudo-account number to each seller 16 in each closed sale and assigning 158 a pseudo-account number to each bidder 18 in each closed sale. Of course, the pseudo-account number for the seller 16 and the bidder 18 are different from each other. Further, each pseudo-account number assigned to each bidder 18 is different from each other. Thus, because each seller 16 and all bidders 18 have different pseudo-account number assigned in each closed sale, the identities of each user 14 should always be masked.

The sellers 16 and the bidders 18 may desire to have their identities masked even after the closed sale is complete. To accommodate the exchange of components 1 and money, or another medium of exchange, the provider 12 may facilitate the exchange. That is, the step of allowing 142 the seller 16 and the bidder 18 to complete the sale of the at least one component 1 may also include the steps of accepting 170 a payment from the bidder 18 for the component 1, accepting 172 the transfer of the component 1 from the seller 16, forwarding 174 the payment to the seller 16, and forwarding 176 the component to the bidder 18. While the parties to such an exchange would likely mask any indications on the component 1 that would reveal their own identity, the provider 12 would typically repackage the components 1 to eliminate any shipping information that could be used to reveal a user's 14 identity. The provider 12 may charge a fee for such a service.

Alternatively, if one or both users 14, that is, seller 16 and bidder 18, are not concerned with masking their identities following the closed sale, the provider 12 may reveal 180 to the seller the bidder's identity, or, the provider 12 may reveal 182 to the bidder the seller's identity, or may do both. Such a revelation is preferably performed by a private communication. After the seller 16 and the bidder 18 make any required arrangements, the seller 16 is then allowed 184 to transfer ownership of the component 1 to the bidder 18. If the seller 16 has possession of the component 1, the seller 16 may transfer 186 the component 1 to the bidder 18. If, however, the component 1 is stored at another facility, such as, but not limited to, a warehouse, the seller 16 may simply inform 188 the party having possession of the component 1 of the change in ownership.

Because bidders 18 may be related to, or otherwise favored by, the seller 16, the method further contemplates a multiple-tier closed sale. For example, a preferred or first tier bidder 18A could be a related company, a second tier bidder 18B may be another manufacturer, and a third tier bidder 18C may be an excess inventory broker. In this embodiment, each seller 16 could identify which tier a bidder 18 would belong. Each tier would have access to different web sites 40A, 40B displaying the closed sale. In order to favor certain bidders 18, such as the first tier bidders 18A, the provider 12 may delay access to the lower tier web site 40B. That is, the first tier bidders 18A would be allowed 190 to bid immediately after the closed sale start date while the second tier bidders 18B would only be allowed 192 to bid a set period of time after the closed sale start date.

In another embodiment, the provider 12 would identify 200 bidders 18 as first tier bidders 18A or identify 202 at least one bidder 18 as second tier bidders. As the provider 12 may not know the corporate relation between all sellers 16 and bidders 18, the provider 12 would, preferably, place all manufacturers in the first tier and all excess inventory brokers in the second tier. Again, the first tier bidders 18A would be allowed 190 to bid immediately after the closed sale start date while the second tier bidders 18B would only be allowed 192 to bid a set period of time after the closed sale start date. Further, certain bidders 18, and especially certain second tier bidders 18B, may be unacceptable to a seller 16. Thus, a seller 16 may also be allowed 210 to identify acceptable second tier bidders 18B. Only the acceptable second tier bidders 18B would be allowed 212 to bid on the component 1.

To accomplish the method of utilizing a multiple tier closed sale, the step of providing 102 a forum 36 includes the steps of providing 220 a first tier forum 36A and providing 222 a second tier forum 36B. Similarly, the step of allowing 132 the bidder 18 to access the forum 36 includes the steps of allowing 224 each first tier bidder 18A to access said first tier forum 36A and allowing 226 each second tier bidder 18B to access the second tier forum 36B.

In any closed sale, the seller 16 may wish to display a private, first identification number 44 to a related user 14. Such a procedure would allow such a related user 14 to search the web site 40 using such private, first identification numbers 44. Thus, the step of allowing 162 each user to register for an account associated with the web site 40 includes the step of allowing 230 each user 14 to identify related users 14. Further, the step of offering 120 the component for sale in the forum 36 by presenting to the public the second identification number 46 may include the step of offering 232 the component 1 for sale in the forum 36 by presenting the first identification number 44 to each related user 14 of the seller 16. Similarly, where a component 1 has a public third identification number 48, the seller 16 may wish for that number to be displayed. Accordingly, the step of offering 120 the component for sale in the forum 36 by presenting to the public the second identification number 46 include the step of offering 234 the at least one component 1 for sale in the forum 36 by presenting the third identification number 48.

As noted above, the at least one component 1 may include a plurality of fungible components 1. In some instances, the components 1 may be sold in less than the entire quantity. For example, if 1,000 components 1 were for sale, a certain bidder 18 may only desire to purchase 100 components 1. Thus, the step of allowing 138 the bidder 18 to bid on the at least one component 1 may include the further step of allowing 240 the bidder to bid on a portion of the plurality of fungible components 1. Further, the step of allowing 140 the seller 16 to accept a bid from the bidder 18 then includes the step of allowing 242 the seller 16 to accept a bid from a bidder 18 on the portion of the plurality of fungible components 1. When such a partial sale occurs, the web site 40 is updated to reflect a reduced quantity of components 1 for sale. That is, the provider presents 244 the number of components 1 within the plurality of fungible components 1 available for sale and, after the seller 16 accepts a bid from the bidder 18 on a portion of the plurality of fungible components 1, the provider presents 246 the number of the remaining components 1 within the plurality of fungible components 1 available for sale. If the closed sale is a multi-tier closed sale, both the first and second tier web sites 40A, 40B would be updated to reflect a reduced quantity of components 1 for sale.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of reselling components between two or more users, said components having a set of characteristics, at least a private identification number and a public identification number, said method comprising the steps of:
   providing an auction web site;
   registering, using a computer processor, at least two users on said auction web site, wherein said at least two users are each registered using a different identification number and password, wherein one of said at least two users is a seller and one of said at least two users is a bidder; and
   initiating at least a first and second closed auction on said auction web site, wherein each auction includes:
      receiving, from said seller, said private identification number and said public identification number for at least one component to be offered for sale in said auction;
      masking the identities of said seller and said bidder by preventing said user identification numbers for said seller and said bidder from being displayed and generating unique pseudo-account numbers to represent each said seller and said bidder and displaying said unique pseudo-account numbers in each said auction in place of said identification numbers for each of said seller and said bidder; and during said auction, displaying said public identification number for said at least one component and preventing said private identification number for said at least one component from being displayed.

2. The method of claim 1 further including the step of:
allowing said bidder to bid on said at least one component.

3. The method of claim 2 further including the step of:
allowing said seller to accept a bid from said bidder.

4. The method of claim 3 further including the step of:
allowing said seller and said bidder to complete the sale of said at least one component.

5. The method of claim 4 wherein said step of allowing said seller and said bidder to complete the sale of said at least one component includes the steps of:
revealing to said seller said bidder's identity via a private communication; and
allowing said seller to transfer ownership of said at least one component to said bidder.

6. The method of claim 4 wherein said step of allowing said seller and said bidder to complete the sale of said at least one component includes the steps of:
revealing to said bidder said seller's identity via a private communication; and
allowing said seller to transfer ownership of said at least one component to said bidder.

7. The method of claim 4 wherein said step of allowing said seller and said bidder to complete the sale of said at least one component includes the steps of:
accepting a payment from said bidder for said at least one component;
accepting the transfer of said at least one component;
forwarding said payment to said seller; and
forwarding said at least one component to said bidder.

8. The method of claim 4 wherein said step of initiating at least first and second closed auction on said auction web site further including the steps of:
identifying at least one said bidder as a first tier bidder;
identifying at least one said bidder as a second tier bidder;
allowing each first tier bidder to bid immediately after said closed sale start date; and
allowing each second tier bidder to bid a set period of time after said closed sale start date.

9. The method of claim 8 wherein said steps of allowing said bidder to bid on said component, and allowing each second tier bidder to bid a set period of time after said closed sale start date, includes the steps of:
allowing said seller to identify acceptable second tier bidders; and
allowing only acceptable second tier bidders to bid on said at least one component.

10. The method of claim 8 further including the steps of:
providing a first tier web site;
allowing each said first tier bidder to access said first tier web site;
providing a second tier web site; and
allowing each said second tier bidder to access said second tier web site.

11. The method of claim 4 wherein said at least one component is a plurality of fungible components and wherein said step of allowing said bidder to bid on said at least one component and allowing said seller to accept a bid from said bidder includes the steps of:
allowing said bidder to bid on a portion of said plurality of fungible components; and
allowing said seller to accept a bid from said bidder on said portion of said plurality of fungible components.

12. The method of claim 11 further including the steps of:
presenting the number of components within said plurality of fungible components available for sale; and,
after said seller accepts a bid from said bidder on said on a portion of said plurality of fungible components, presenting the number of the remaining components within said plurality of fungible components available for sale.

13. The method of claim 1 wherein said steps of registering, using a computer processor, at least two users on said auction web site, and, displaying said component public identification number includes the steps of:
allowing each user to identify related users; and
offering said at least one component for sale in said forum by presenting said component public identification number to each related user of said seller.

14. The method of claim 1 wherein said components have a further public, third identification number and wherein said step of displaying said component public identification number includes the step of offering said at least one component for sale on said web site by presenting said third identification number.

* * * * *

UNITED STATES PATENT AND TRADEMARK OFFICE
CERTIFICATE OF CORRECTION

PATENT NO. : 7,797,202 B1  
APPLICATION NO. : 12/070714  
DATED : September 14, 2010  
INVENTOR(S) : Paul F. Hinckley et al.

Figure 2A:
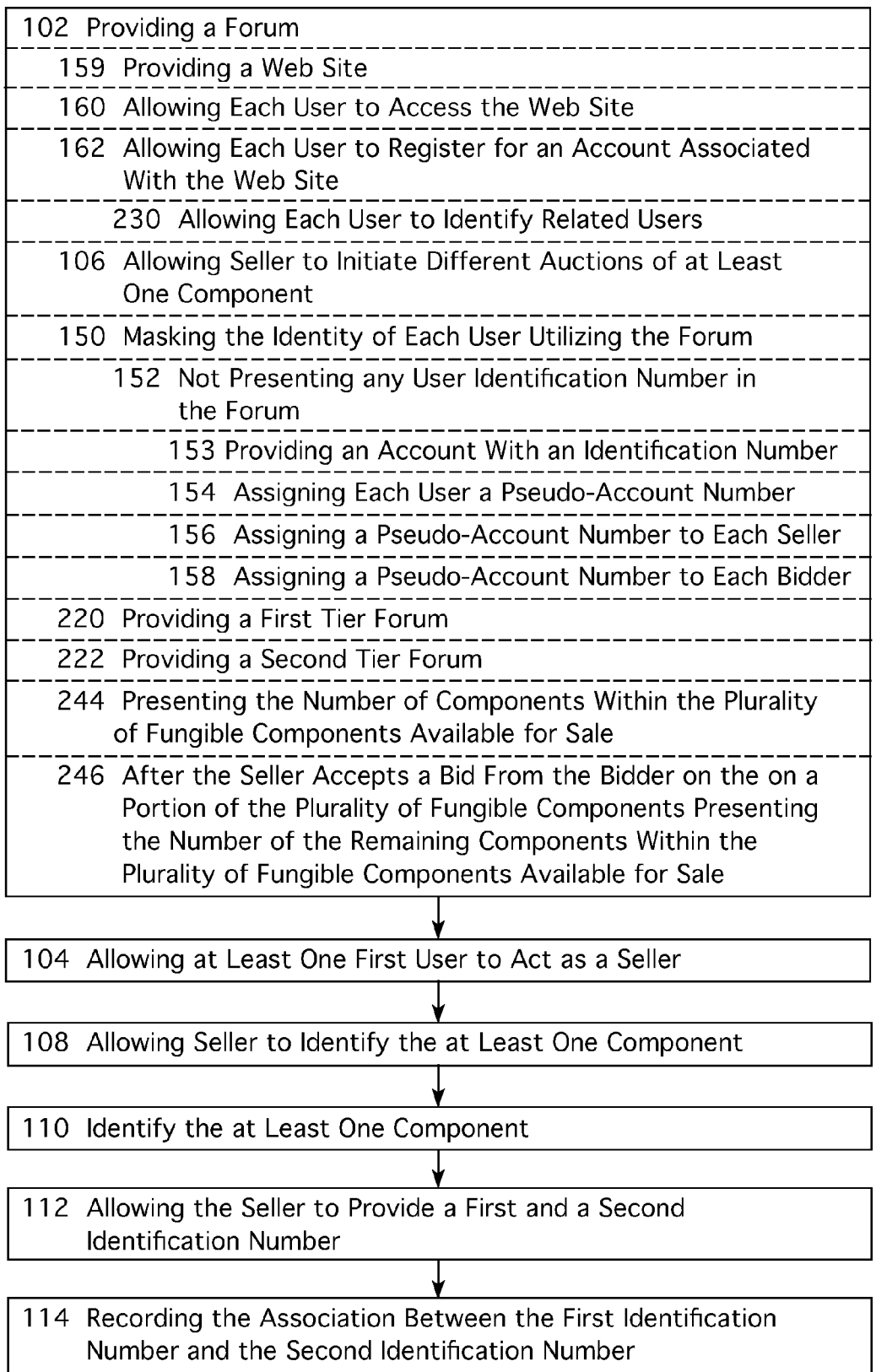
FIGS. 2A, 2B, and 2C are a flow chart of the steps of the method.
Figure 2B:
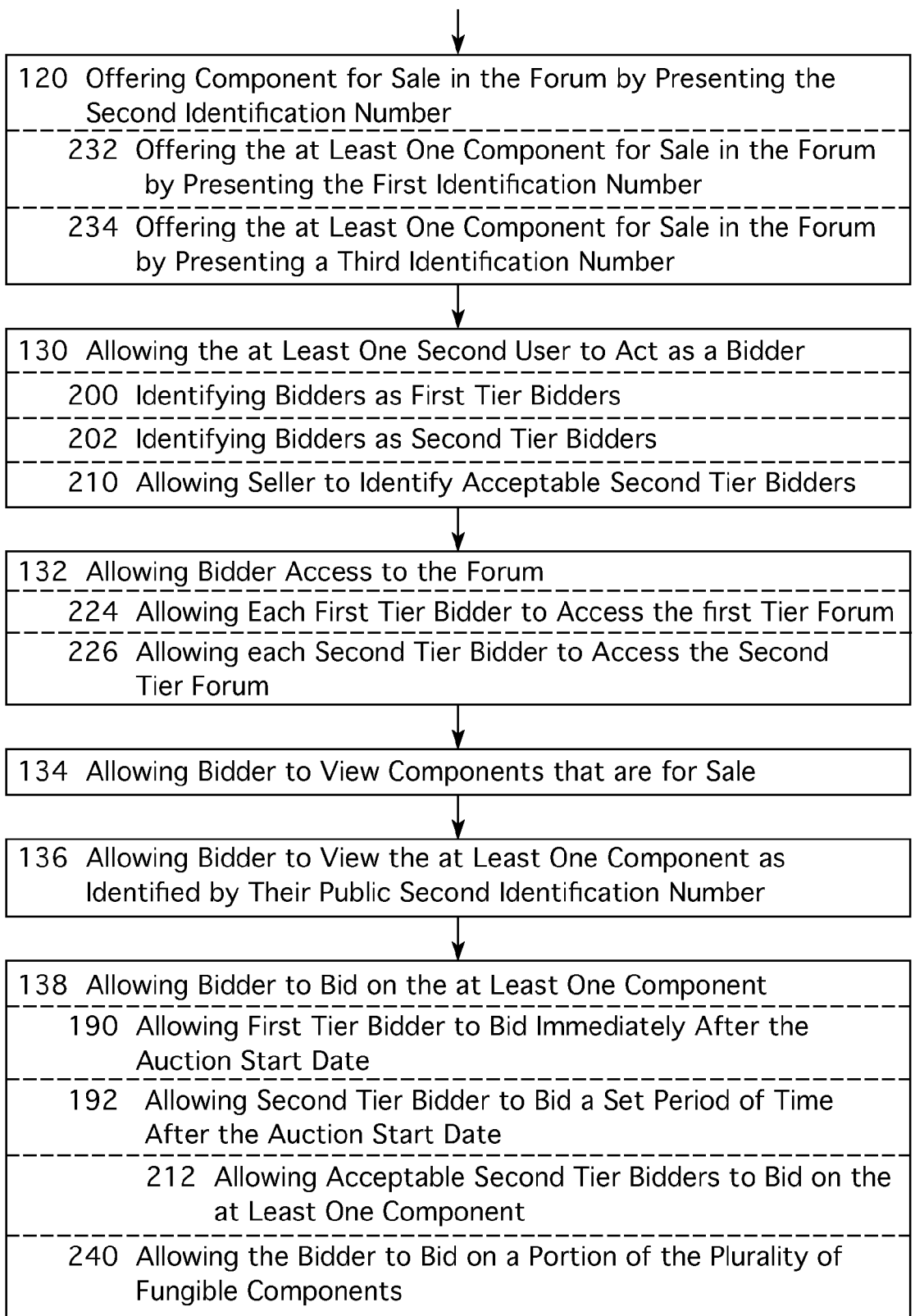
Figure 2C:
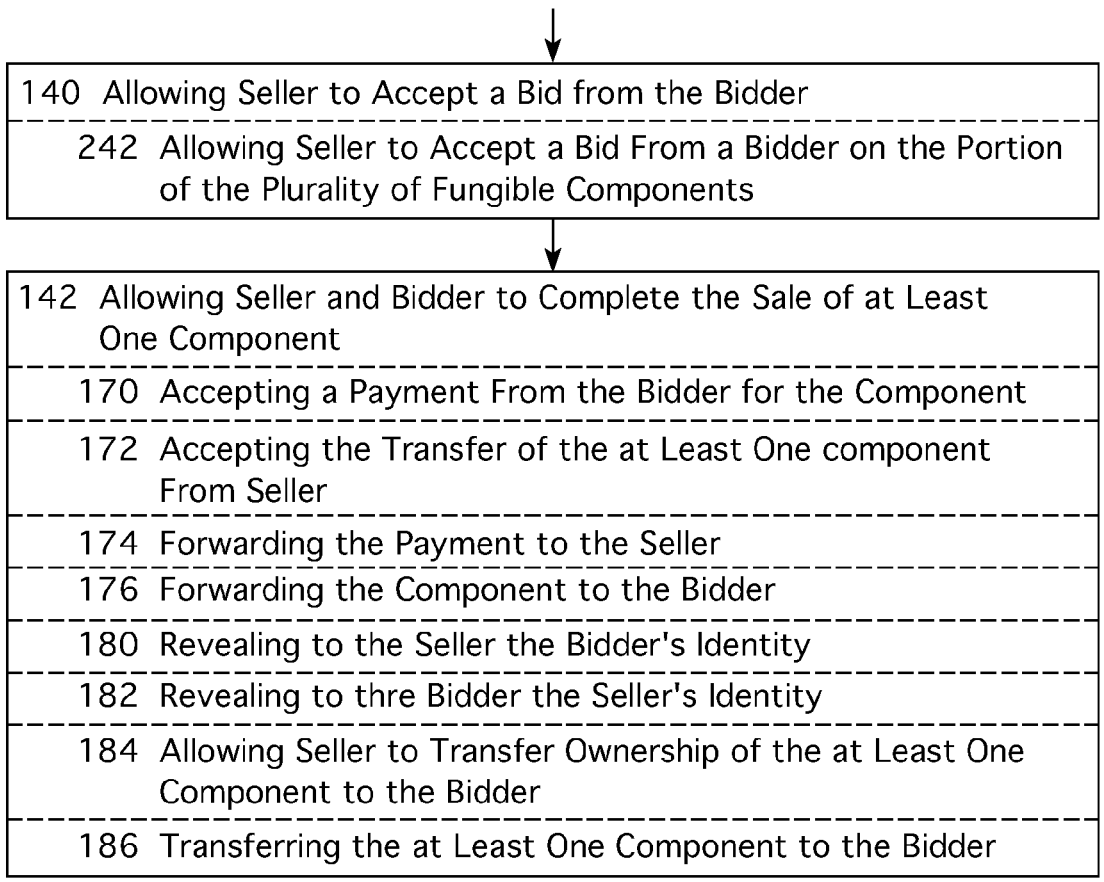

It is certified that error appears in the above-identified patent and that said Letters Patent is hereby corrected as shown below:

Figure 2A, line 246, "on the on a" should read --on the--.  
Figure 2C, line 182, "to thre Bidder" should read --to the Bidder--.  
Column 2, line 58, "computer network" should read --computer network.--.  
Column 3, line 65, "identities to and" should read --identities and--.  
Column 4, line 37, "network which" should read --network in which--.  
Column 4, line 38, "act with via" should read --act via--.  
Column 5, line 20, "send" should read --sends--.  
Column 7, line 29, "identify which" should read --identify in which--.  
Column 8, line 10, "include the" should read --includes the--.  
Column 10, line 28, "on said on a" should read --on said--.

Signed and Sealed this  
Fourteenth Day of August, 2012

David J. Kappos  
*Director of the United States Patent and Trademark Office*